US00RE37807E

(19) United States
(12) Reissued Patent
Shingle et al.

(10) Patent Number: US RE37,807 E
(45) Date of Reissued Patent: Jul. 30, 2002

(54) METHOD AND STRUCTURE FOR CONTROLLING AN APPARATUS, SUCH AS A FUEL INJECTOR, USING ELECTRONIC TRIMMING

(75) Inventors: Ronald D. Shingle, Peoria; Richard A. De Keyser, Edelstein; Vernon R. Smith, Peoria, all of IL (US); Stephen F. Glassey, Gulnare, CO (US); Yasser A. Al Charif, Farmington, MI (US)

(73) Assignee: Caterpillar Inc., Peoria, IL (US)

(21) Appl. No.: 09/322,770

(22) Filed: May 28, 1999

Related U.S. Patent Documents

Reissue of:
(64) Patent No.: 5,634,448
Issued: Jun. 3, 1997
Appl. No.: 08/251,549
Filed: May 31, 1994

(51) Int. Cl.[7] ..... F02D 41/34; F02D 41/40
(52) U.S. Cl. ..... 123/480; 123/478; 123/119 A
(58) Field of Search ..... 123/357, 478, 123/480, 501, 502; 73/119 A

(56) References Cited

U.S. PATENT DOCUMENTS

| | | | | |
|---|---|---|---|---|
| 2,106,932 A | | 2/1938 | Rosen | 123/129 |
| 2,485,033 A | | 10/1949 | Budzien | 123/179 |
| 2,642,047 A | | 6/1953 | Johnson | 123/1 |
| 3,336,874 A | | 8/1967 | Buescher et al. | 417/499 |
| 4,185,779 A | | 1/1980 | Watson | 239/533.3 |
| 4,200,064 A | * | 4/1980 | Engele | 123/674 |

(List continued on next page.)

OTHER PUBLICATIONS

Lauvin et al. "Electronically Controlled High Pressure Unit Injector System for Diesel Engines," SAE Technical Paper Series 911819, Sep. 1991.

Tobolt, Exerpt from "Diesel Fundamentals, Service, Repair," 1980, pp. 97–101, 271–272, 297, The Goodheart–Wilcox Co. Inc., South Holland, IL.

Hames et al. "DDEC II—Advanced Electronic Diesel Control" SAE Technical Paper Series 861049, 1986.

Hames et al. "DDEC Detroit Diesel Electronic Control" SAE Technical Paper Series, 850542, Feb. 1985.

Smith, "Have Screwdriver, Will Steal", Car and Driver, vol. 40, No. 1, Jul. 1994, pp. 157–167.*

1994 Chevrolet Camaro Brochure, Jul. 1993.*

*Primary Examiner*—Willis R. Wolfe
*Assistant Examiner*—Mahmoud Gimie
(74) *Attorney, Agent, or Firm*—Michael B. McNeil; Joseph W. Keen; Mark D. Becker

(57) ABSTRACT

A structure and method for electronically minimizing or eliminating performance variation of an apparatus controllable by a control signal, such as an electronically-controlled fuel injector, is disclosed. The method includes the steps of measuring the resultant characteristics of the apparatus at a plurality of operating conditions, such as timing and delivery characteristics of the fuel injector, adjusting the control signal as a function of the measured resultant characteristics, such as by adjusting a base timing and duration or pulse width of a fuel delivery command signal for a fuel injector, and controlling the apparatus in accordance with the adjusted control signal to reduce performance variation. A structure is disclosed to compensate or trim for individual injector variation, includes an electronic control module having a memory for storing trim signals for each injector, the trim signals being derived from observed performance parameter values taken at a plurality of operating conditions, a plurality of sensors for detecting at least one, and preferably a plurality of operating parameters and generating a respective one, and preferably a plurality of, operating parameter signals, and a means for communicating the trim signals to the memory. The electronic control module adjusts a base fuel delivery signal for each injector as a function of the trim data signals for each injector.

47 Claims, 7 Drawing Sheets

U.S. PATENT DOCUMENTS 4,223,644 A * 9/1980 Latsch et al. ..... 123/674 X
4,271,804 A * 6/1981 Bianchi et al. ..... 123/674
4,379,332 A * 4/1983 Busser et al. ..... 364/431.05
4,402,294 A * 9/1983 McHugh et al. ..... 123/480
4,699,320 A * 10/1987 Sisson et al. ..... 239/90
4,705,000 A 11/1987 Matsumura et al. ..... 123/357
4,766,864 A * 8/1988 Ban et al. ..... 123/357
4,790,227 A * 12/1988 Schechter ..... 123/357
4,972,293 A * 11/1990 Verner ..... 123/480 X
5,086,743 A * 2/1992 Hickey ..... 123/472 X
5,150,690 A * 9/1992 Carter ..... 123/487 X
5,297,523 A 3/1994 Hafner et al. ..... 123/456
5,564,391 A 10/1996 Barnes et al. ..... 123/446
5,653,210 A * 8/1997 Fischer et al. ..... 123/501
5,986,871 A * 11/1999 Forch et al. ..... 361/160
6,148,800 A * 11/2000 Cari et al. ..... 123/490

* cited by examiner

METHOD AND STRUCTURE FOR CONTROLLING AN APPARATUS, SUCH AS A FUEL INJECTOR, USING ELECTRONIC TRIMMING

Matter enclosed in heavy brackets [ ] appears in the original patent but forms no part of this reissue specification; matter printed in italics indicates the additions made by reissue.

TECHNICAL FIELD

The present invention relates generally to a method and structure of controlling an apparatus and, more particularly, to a method and structure of controlling a fuel injector via electronic trimming.

BACKGROUND ART

In an engine fuel system having a plurality of fuel injectors, it is typically desirable that each injector deliver approximately the same quantity of fuel in approximately the same timed relationship to the engine for proper operation. Several problems arise when the performance, or, more particularly, the timing (i.e., the time between the application of a fuel delivery command and the Start of Injection (SOI)) and delivery (i.e., the quantity and pressure of the delivered fuel) of the injectors diverge beyond acceptable limits. One problem caused by injector performance deviation or variability is that different torques are generated between cylinders due to unequal fuel amounts being injected, or from the relative timing of such fuel injection. Further, knowledge that such variations are inevitable require engine system designers to account for this variability; accordingly, many engine systems are designed not for peak or maximum cylinder pressures or output, but rather, are designed to provide an output equal to the maximum theoretical output less an amount due to the worst case fuel injector variability.

One approach for solving these problems in unit injectors is the so-called select fit manufacturing process. Generally, a common procedure involves flowing fluid through each unit injector nozzle and pumping mechanism and categorizing each nozzle and pumping mechanism accordingly. During assembly, nozzles are matched with pumping mechanisms knee to be compatible, depending on the category into which each was categorized. The disadvantage associated with this approach is the relatively high cost involved with sorting the nozzles and pumping mechanisms and maintaining these groupings for the duration of the manufacturing and assembly process, Another approach for solving these problems involves extremely rigid manufacturing procedures for achieving high manufacturing precision necessary to meet the desired design specification. Such high manufacturing precision has the disadvantage of increasing the manufacturing cost, including the cost involved in manufacturing precision components and subassemblies and the costs related to the subsequent assembly process. Further, neither of the above-mentioned manufacturing-oriented solutions satisfactorily controls rejection of completely assembled injectors that fail to fall within the timing and delivery tolerances of the design specification. Thus, excess scrap remains a problem with these manufacturing-oriented approaches.

With the advent of increasingly sophisticated electronic control, a new approach to the problem of timing and delivery variations has emerged. In known electronic fuel injection systems, especially diesel-cycle internal combustion engine systems, the timing or start of injection, as well as the end of injection, or duration (delivery) is controlled by as electronic control, which controls these parameters for all of the engine cylinders.

An early attempt at using an electronic control to compensate for individual injector timing and delivery variations in an engine system involved measuring the flow characteristics of a particular injector at a single operating condition, and obtaining constants from this empirical testing, relative to an ideal fuel injector, and using these constants to modify a nominal control signal to compensate for the measured variation. This approach has proven unsatisfactory because it does not take into account the fact that timing and delivery variations exist not only between injectors, but as a function of the particular operating condition at which the injectors are operated. For example, it may be observed that at a low speed, low load condition, an individual injector may have greater variability from nominal specifications than at a high speed, high load condition. Thus, this approach has failed to provide a reduced injector to injector and injector to nominal performance variation necessary to meet today's increasingly strict emission standards.

Others have tried to compensate for variation in the start of injection characteristic of individual injectors in an engine system by designating a proxy of the timing or the start of injection characteristic of the injector. In general, these methods first electrically detect the closure of a valve used in controlling the start and duration of fuel injection, in response to an injection command. These methods further assume that the time between valve closure and the start of injection is fixed. Given these two time intervals, the injection command can be modified to compensate for variation in the time between the injection command and valve closure. The problem that remains with this type of approach is that the detected valve closure does not precede the start of injection by a fixed time period. Many factors, including manufacturing and assembly variations, contribute to vary the actual start of injection from a nominal value. Thus, this approach does not eliminate injector to injector and injector to nominal variation due to variations of the valve-closure to start of injection time interval.

Accordingly, there is a need to provide an improved method and structure for controlling an apparatus, such as a fuel injector, that minimizes or eliminates one or more of the problems as set forth above.

DISCLOSURE OF THE INVENTION

This invention provides for reduced variation of a resultant characteristic of an apparatus with respect to a nominal resultant characteristic, and further with respect to a resultant characteristic of another apparatus, without the prohibitive expense and inherent limitations associated with prior art manufacturing electronic control approaches. In general, the method of this invention is performed in conjunction with an apparatus of the type having a nominal resultant characteristic at a plurality of operating conditions, and controllable in accordance with a control signal to achieve the nominal resultant characteristics. The method comprises three basic steps. The first step includes measuring the resultant characteristic associated with the apparatus at a plurality of operating conditions.

In the second step, a control signal is adjusted as a function of the resultant characteristics of the apparatus measured in the first step. Finally, in the third step, the apparatus is controlled in accordance with the adjusted signal such that the resultant characteristics of the apparatus, when operated, approach the nominal resultant characteristics expected of an apparatus of that type.

The method of the present invention is advantageously employed in the control of a plurality of fuel injectors of the type having a nominal start of injection characteristics, and where fuel injection is controlled by a fuel delivery signal. The method of the present invention, as applied to electronically-controlled fuel injectors, simply and inexpensively reduces the start of injection variation as between a plurality of fuel injectors, and with respect to a nominal start of injection characteristic of injectors of this type. The method comprises four basic steps. The first step includes measuring, for each injector, a respective start of injection characteristic. The next step comprises associating, for each injector, the measured start of injection characteristic with the respective injector. The third step includes adjusting the fuel delivery signal, for each injector, as a function of the variation of the measured start of injection characteristic from the nominal start of injection characteristic for injectors of that type. The fourth and final basic step of the method of this invention includes controlling each injector in accordance with a respective adjusted fuel delivery signal to reduce start of injection and variation.

A problem with prior art manufacturing-oriented approaches for reducing performance variations involved costly nozzle/pumping mechanism sorting and matching. Accordingly, in a further aspect of the present invention, the basic step of associating the measured start of injection characteristic with the respective injector includes the substep of categorizing each injector, based on a respective measured start of injection characteristic, into one of a plurality of trim categories. The trim category designation into which the injection has been categorized is then permanently recorded on the injector itself. The above-mentioned basic step of adjusting the fuel delivery signal accordingly further includes the substeps of reading the data (trim category designation) recorded on the injector and inputting this data into a control means, which is provided for generating the fuel delivery signal. These aspects of the present invention eliminate costly sorting, matching, and tracking the resulting assembly. One way in which the trim category designation is permanently recorded on each injector is through the use of a unique identifier such as a bar code. Accordingly, the steps of reading the data recorded on the injector and inputting this data into the control means are performed by the substeps of seeing the bar codes recorded on the injectors, interpreting each bar code to reconstruct the trim category designation, and transmitting the reconstructed trim category designation into the control means.

A further application to which the present invention may be advantageously employed, is the operation of a plurality of electronically-controlled fuel injectors of the type having a nominal delivery characteristic as a function of operating conditions, where each injector is controlled to deliver fuel by a fuel delivery signal. This method of the present invention comprises four basic steps. The first step includes measuring, for each injector, a respective delivery characteristic at a plurality of operating conditions. The next step of this method comprises associating, for each injector, the measured delivery characteristic with the injector so measured. In the third step, the fuel delivery signal for each injector is adjusted as a function of the variation of the associated measured delivery characteristic from the nominal delivery characteristic for the measured operating conditions. Finally, in the fourth basic step, each injector is controlled in accordance with the respective adjusted fuel delivery signal to minimize delivery variation. A significant aspect of the above-described method of the invention is the step of measuring a delivery characteristic at a plurality of operating conditions. The ability to "trim" injector fuel delivery variations as a function of operating conditions permits a control system to optimize timing and delivery control to advantageously reduce emissions at all operating conditions, as well as increase performance beyond that achievable through prior art mechanically-trimmed methods.

In a further aspect of the present invention, a method is provided for accurately and inexpensively reducing start of injection and delivery variation of electronically-controlled fuel injectors of the type having a nominal start of injection and nominal delivery characteristics. This method of operating a plurality of fuel injectors comprises the steps of measuring, for each injector, a respective start of injection characteristic and delivery characteristic. Next, each injector is categorized into one of a plurality of trim categories as a function of the variation of the measured start of injection and delivery characteristics from the respective nominal start of injection and delivery characteristics for injectors of that type. Each trim category has associated therewith a start of injection offset value and a delivery offset value to be used in a later step for calculating a fuel delivery signal to control the fuel injector. The next step includes recording the category into which each injector was categorized on the respective injector. The fourth step includes storing the respective category recorded on each injector in a memory means of a control means. The control means generates the fuel delivery signal that controls the fuel injectors. The next step includes calculating the fuel delivery signal as a function of actual operating conditions based on nominal start of injection and delivery characteristics. In the next step, the fuel delivery signal for each injector is adjusted as a function of the respective start of injection and delivery offset values. Finally, each injector is controlled in accordance with a respective adjusted fuel delivery signal to reduce the start of injection and delivery variations from injector to injector, as well as from injector to nominal.

In a further aspect of the invention, the last-discussed method is further applied to a hydraulically-actuated electronically-controlled injector having a second signal, in addition to the fuel delivery signal, by which it may be controlled. This second signal is an actuating fluid pressure command signal. Accordingly, this method of the invention further comprises the step of adjusting the actuating fluid pressure command signal for each hydraulically-actuated injector as a function of the respective start of injection and delivery offset values.

Novel structure is used to implement the above described methods of this invention. Accordingly, in a further aspect of the present invention, a system for controlling the delivery of fuel through a plurality of fuel injectors to an engine is disclosed where each injector so controlled if of the type characterized by at least one observed performance parameter. The system comprises sensor means for detecting at least one, and preferably a plurality of, operating parameters and generating signals indicative of each parameter detected, control means for generating a base fuel delivery signal for each injector, memory means coupled to the control means for storing trim data signals for each injector, the trim data signals being derived from observed performance parameter values taken at a plurality of operating conditions, wherein the control means is provided in the system for trimming the base fuel delivery signal for each injector as a function of the trim data signals for reducing performance parameter variation as between the injectors controlled by the system, as well as variation relative to a nominal performance parameter value.

The present invention provides a structure and method of controlling the operation of an apparatus, such as, for example, a plurality of fuel injectors, to reduce fuel injection timing and delivery variation as required to meet emissions and performance goals by compensating for or "trimming" the fuel injection timing and delivery variations of each injector via an electronic control responsive to previously measured resultant or performance characteristics of each fuel injector so controlled by the structure or method herein described.

BEST MODE FOR CARRYING OUT THE INVENTION

Before proceeding to a description of the present invention, an exemplary environment for employing this invention will be described with reference to FIGS. 1–3.

Figure 1:
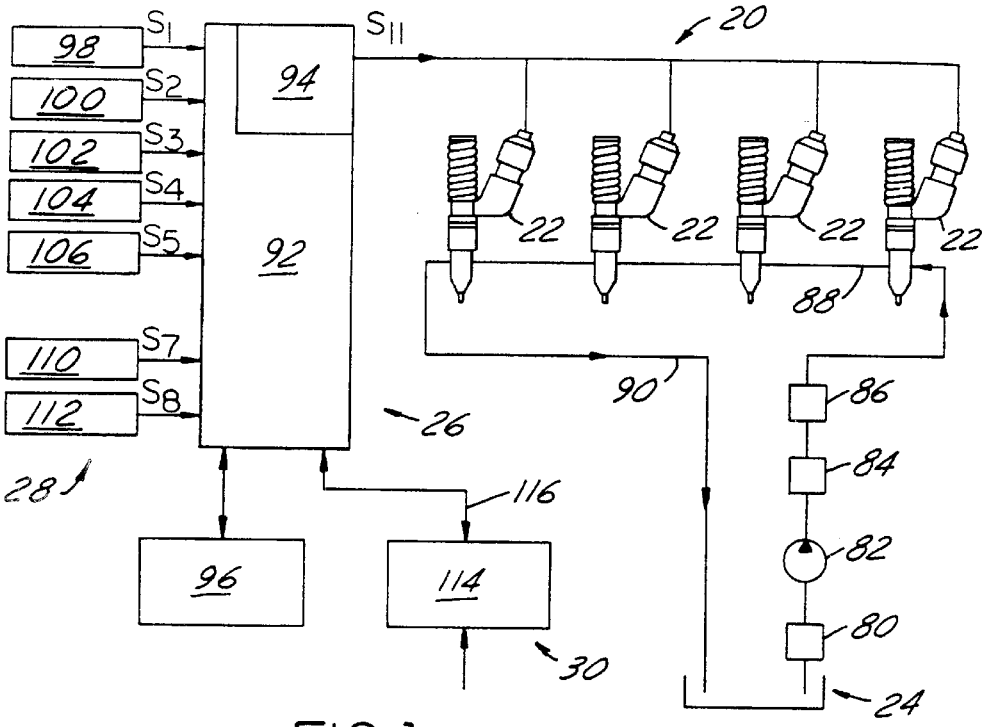
FIG. 1 is a combined block and diagrammatic view of a mechanically-actuated electronically-controlled injector fuel system embodiment of the present invention.

Referring now to drawings wherein like reference numerals are used to reference identical components in various views, FIG. 1 shows a mechanically-actuated electronically-controlled fuel injection system 20 utilizing a plurality of mechanically-actuated electronically-controlled (MEUI) fuel injectors 22 operated in accordance with the present invention. Fuel injection system 20 is preferably adapted for use in a diesel-cycle direct injection internal combustion engine (not illustrated). Although a four cylinder engine is indicated in FIG. 1, it should be understood that the present invention can also be used in other types and configurations of engines. The MEUI fuel system 20 includes at least one injector 22 for each combustion chamber or cylinder of the engine, means or a circuit 24 for supplying fuel to each injector 22, means or a device 26 for electronically-controlling the fuel system 20, sensor means 28 for detecting at least one, and preferably a plurality of, system operating parameters and generating a signals indicative of the respective parameter detected, and means or a device 30 for communicating information to controlling means 26.

Figures 2A, 2B:
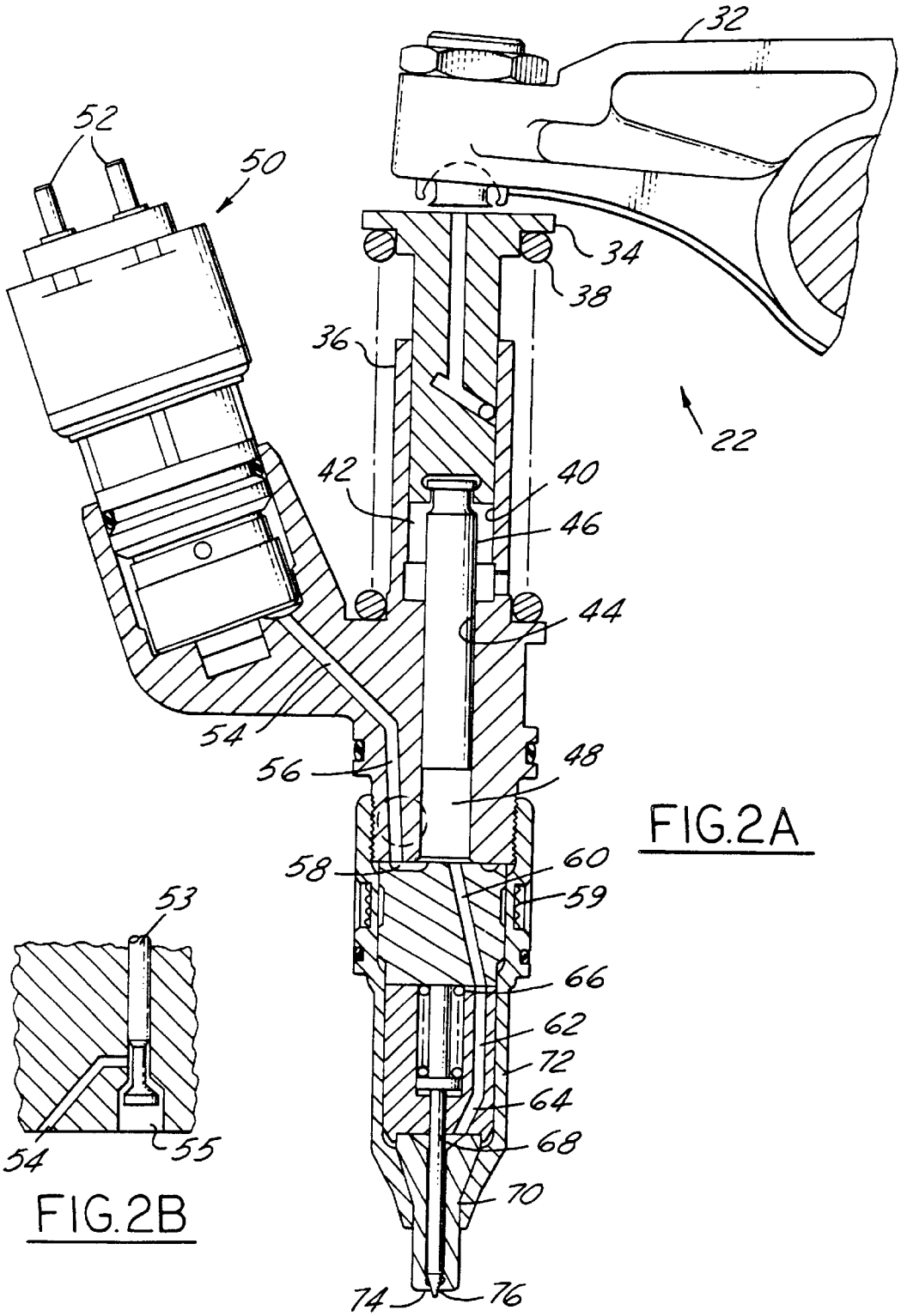
FIG. 2A is a diagrammatic, fragmentary, cross-sectional view showing one of the fuel injectors of FIG. 1.
FIG. 2B is a diagrammatic, fragmentary, cross-sectional view showing the poppet valve control of the solenoid assembly of FIG. 2A.

Referring now to FIG. 2A, injector 22 includes injector rocker arm 32, injector tappet or follower 34, injector body 36, and injector follower spring 38. Injector body 36 includes a centrally-disposed stepped bore 40 having a larger diameter portion 42, and a smaller diameter portion 44.

Injector rocker arm 32 is driven by an engine cam shaft (not illustrated) and bears on injector follower 34. Follower 34 is slidably received in bore 40 for reciprocal movement therein. Compression spring 38 bears against body 36 and against an annular step formed on the upper portion of injector follower 34 and is provided for urging follower 34 upwardly relative to body 36.

Injector 22 further includes a plunger 46 slidably received in the smaller diameter portion 44 and connected with injector follower 34 for reciprocal motion therewith. Injector body 36 and the bottom face of plunger 46 define a plunger chamber 48. Injector 22 further includes a solenoid and valve assembly 50, which includes electrical terminals 52 for actuating solenoid assembly 50.

Referring to FIG. 2B, a functional, diagrammatic representation of solenoid and valve assembly 50 is depicted. The solenoid assembly 50 includes a poppet valve 53, a first fuel passage 54, and a passage 55 to a fuel supply.

Referring to FIG. 2A, injector body 36 further includes a second fuel spill passage 56, annular passage 58, fuel inlet 59, first discharge passage 60, second discharge passage 62, third discharge passage 64, needle check spring 66, axially movable needle check or valve 68, needle check tip 70, case 72, annular seat 74, and fuel injection spray orifices 76.

As shown in FIG. 1, means or device 24 for supplying fuel to injector 22 comprises a fuel tank or supply 78, a primary filter 80, a fuel transfer and priming pump 82, an electronic cooling means 84, a secondary filter 86, a fuel manifold 88, and a fuel return line 90.

The means or device 26 for electronically controlling the MEUI fuel system 20 preferably includes a programmable electronic control module 92 having an output means 94 for generating a fuel delivery command signal $S_{11}$. The fuel delivery command signal is supplied to each injector 22 and determines the time for starting fuel injection and the quantity of such fuel injection (by the duration of the Signal $S_{11}$) during each injection event. Further coupled with controlling module 92 is memory means 96, which may take the form of a non-volatile random access memory (NVRAM). The memory means 96 is provided for storing various "trim" data signals for each of the injectors 22 so that variation of the timing and delivery characteristics of each injector 22 relative to the other injectors, and relative to a nominal timing and delivery characteristic for injectors of this type, can be reduced through appropriate control by electronic controlling means 26. Further, memory means 96 may include Read-Only Memory (ROM) for storing and reading predetermined operating data and the various programmed control strategies.

The sensor means 28 is provided in fuel system 20 for detecting various operating parameters and generating a respective parameter indicative signal $S_{1\text{-}8}$, hereinafter referred to as input data signals, the data signals being indicative of the respective parameter detected. Sensor means 28 preferably includes one or more conventional sensors or transducers which periodically detect directly or indirectly one or more parameters and generate corresponding data signals that are provided as inputs to electronic control module 92. Preferably, sensor means 28 includes an engine speed sensor 98 adapted to detect engine speed and generate an engine speed signal $S_1$, an engine crank shaft position sensor 100 adapted to detect engine crank shaft position and generate an engine crank shaft position signal $S_1$, an engine coolant temperature sensor 102 adapted to detect engine coolant temperature and generate engine coolant temperature signal $S_3$, an engine exhaust back pressure sensor 104 adapted to detect engine exhaust back pressure and generate an engine exhaust back pressure signal $S_4$, an air intake manifold pressure sensor 106 adapted to detect air intake manifold pressure and generate air intake manifold pressure signal $S_5$, a throttle position setting sensor 110 adapted to detect a throttle position setting and generate a throttle position setting signal $S_7$, and a transmission gear setting sensor 112 adapted to detect the setting of an automatic transmission and to generate an automatic transmission setting signal $S_8$ (for those controls so equipped).

The means or device 30 for communicating information to controlling means 92 may, for example, take the form of a bar code reader or scanner 114 coupled to controlling module 92 via a communication link 116, which may take the form of a serial link. Alternatively, communicating means 30 may take the form of a keyboard and a conventional general purpose computer, a "dumb" terminal, or a specialized tool adapted to interface with control module 92. It should be appreciated by those skilled in the art that the means 30 for communicating the information may take various forms and not depart from the spirit and scope of this invention.

In operation, fuel under pressure enters injector 22 via fuel inlet 59. The fuel passes through passages in injector 22 to the fuel plunger chamber 48. The plunger 46 operates up and down in smaller diameter portion 44 of body 36. Fuel plunger chamber 48 is open to the fuel supply by passages 58, 56, 54, and 55 when valve 53 is open.

The Motion of injector rocket arm 32 is transmitted to plunger 46 by the injector follower 34 which bears against follower spring 38. Thus, so long as poppet valve 53 is not closed, passage 54 communicates with fuel supply passage 55 and no injection pressure is generated by the downward motion of plunger 46.

The timing and metering functions of injector 22 are implemented by operation of solenoid valve assembly 50. As mentioned above, so long as valve 53 remains open, no injection pressure is generated by the downward movement of plunger 46. Closure of the valve 53, however, initiates pressurization and fuel injection. When a fuel delivery command is applied across terminals 52 of solenoid assembly 50, the electrically-energized solenoid valve 53, shown in FIG. 2B, moves relatively upwardly to cut off communication of plunger chamber 48, via passages 54, 56, and 58, with the passage 55 to the fuel supply. As plunger 46 moves downward, under pressure of injector rocker arm 32, the trapped fuel under plunger 48 is subjected to increased pressure by the continued downward movement of plunger 46. The pressurized fuel in chamber 48 is communicated via passages 60, 62, and 64 to the upper portion of needle check tip 70. The pressurized fuel further passes through a diametrical clearance between needle check 68 and needle check tip 70 to the portion of needle check 68 abutting annular seat 74. When sufficient pressure is built up by the downward movement of plunger 46, the resulting upward force on needle check 68 overcomes an opposing force exerted by needle check spring 66, wherein the pressurized fuel acts on needle check 68 to lift fuel cheek 68 from annular seat 74. The pressurized fuel is then discharged through one or more fuel injection spray orifices 76.

The duration of valve 53 closure determines the duration of fuel injection, and thus, defines the quantity of fuel injected by injector 22.

To end injection, the fuel delivery signal is discontinued, thus electrically de-energizing the solenoid valve 53 and allowing valve 53 to open. Since the pressurized fuel chamber 48 again communicates with the fuel passage 55 to the fuel supply via passages 58, 56, and 54, the fluid pressure therein decays such that the force of the compressed needle check spring 66 moves needle check 68 downwardly against annular seat 74 of needle check tip 70 to end injection. The upwardly traveling plunger 46 allows inlet fuel to refill plunger chamber 48 via inlet 59.

Figure 3:
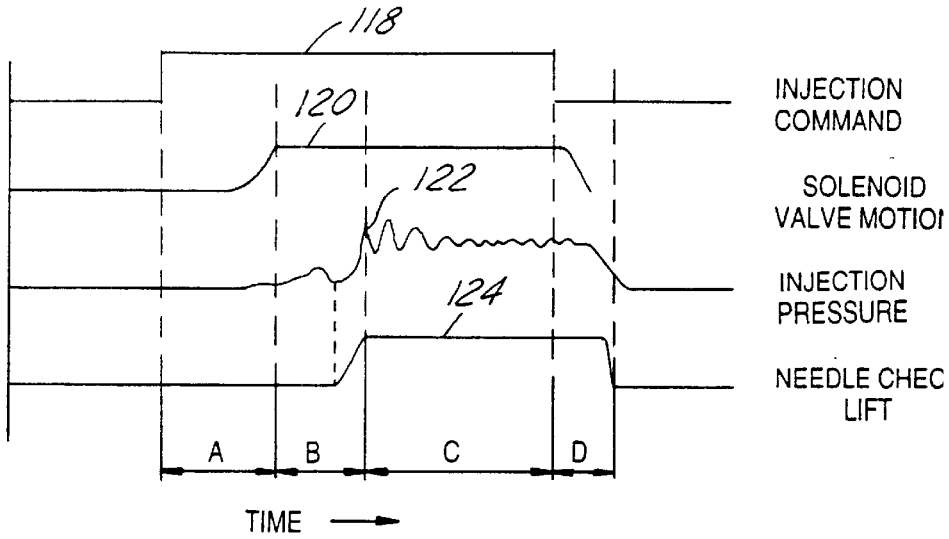
FIG. 3 is a diagrammatic, partial, simplified timing diagram showing the sequence of events resulting from application of a fuel delivery command to a fuel injector, including the solenoid valve motion and the needle check lift.

Referring now to FIG. 3, an exemplary timing diagram depicting in greater detail, the sequence of events resulting from the application of fuel delivery command $S_{11}$ across terminals 52 of solenoid valve 50. Trace 118 depicts a fuel delivery command $S_{11}$ as applied across terminals 52 of injector 22, and is a signal which may be controlled by control module 92 to carry out the present invention. Trace 120 represents the motion of valve 53 in response to fuel delivery signal $S_{11}$. Trace 122 represents the injection pressure of fuel in injector 22. It should be understood that in the embodiment shown it is the downward travel of plunger 46 that generates injection pressure shown in trace 122 which is by a camshaft/rocker arm 32 assembly and which is not directly controlled by module 92; accordingly, the application of fuel delivery injection command $S_{11}$ must be made in timed relation with the reciprocal motion of plunger 46. Trace 124, depicts the motion or lift of needle check or valve 68. The terminal upward destination of needle check 68 is the position where full injection occurs. (i.e., the interface between intervals B & C is the point wherein the actual start of injection (SOI) begins.) Prior art systems have endeavored to measure, electrically, valve 53 closure, indicated by the A B interface. Those control strategies then assume that time interval B is a fixed and constant time. However, knowledge of the valve closure does not define, by mere addition of a time constant, when the start of injection will occur. There are a plurality of factors related to the manufacture and assembly of injector 22 that cause interval B to vary from unit to unit and from unit to nominal. These factors include the flow characteristics of the injector nozzle assembly itself, housing dead volumes associated with the injector assembly, variations in the needle check spring bias force, etc. Accordingly, prior art systems that seek to measure only interval A while maintaining interval B constant do not reduce satisfactorily variation in timing (i.e. the time interval between the application of fuel delivery command $S_{11}$ and the time fuel injection begins, or, in other words, interval A plus B).

It should also be appreciated that there is a time lag associated with the discontinuance of fuel delivery command $S_{11}$ and the end of injection (EOI), indicated by interval D of FIG. 3. In this embodiment of the present invention, the duration of fuel injection defines the quantity of fuel injected by an individual injector 22, and is defined as the sum of intervals C and D, as shown in FIG. 3. Accordingly, to reduce variations between injectors due to turn-off lag (interval D), the interval D may also be characterized and compensated or corrected for in each one of the plurality of injectors 22 in fuel systems 20. Although this lag can be measured, as indicated above, the commercial implementation of this embodiment of the invention does not "trim" for this aspect of injector 22 variation.

Figure 4:
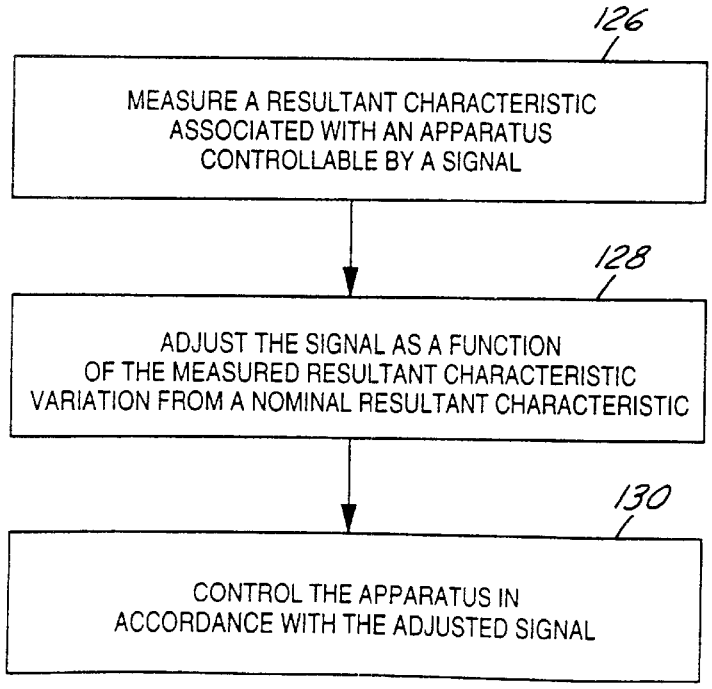
FIG. 4 is a flow chart depicting the general method steps of the present invention for an apparatus.

Having now described in exemplary environment for employing this invention, attention is directed to FIG. 4 which depicts the general method steps of the present invention. In step 126, the initial step is to measure a resultant characteristic associated with an apparatus controllable by a signal. The scope of the present invention is broader than the exemplary embodiment. Any actuatable mechanism may be advantageously controlled or operated in accordance with the present invention. Therefore, the present invention may be applied to any apparatus having a resultant characteristic that may be measured and be controlled. Significantly, step 126 may be performed at a plurality of operating conditions. Accordingly, resultant characteristic variation can be reduced over the entire operating range of the controlled apparatus.

Once the resultant characteristic has been measured in step 126, the method of the present invention proceeds to step 128, where the signal used to control the apparatus is adjusted as a function of the measured resultant characteristic variation from a nominal resultant characteristic. In general, a control signal is generated based on current operating conditions, as well as nominal operating or resultant characteristics of the apparatus under control. Step 128 adjusts this nominal or base signal to compensate or "trim", electronically, the measured resultant characteristic variation of the apparatus.

The final step of the general method of the present invention includes controlling the apparatus in accordance with the adjusted signal. The adjusted signal from step 128 is determined so as to reduce at least one, and preferably two, types of variations. The first type of variation deals with variation of a particular unit from other units of that type. The second type of a variation deals with the variation of the particular unit from a nominal or design specification resultant characteristic. The present invention preferably reduces or eliminates, simply and inexpensively, both types of variation.

The particular steps of the MEUI embodiment (preferred) of the present invention will now be described in detail. It should be understood that prior to performing the steps the present invention, a fuel injector 22, will have been completely machined and assembled according to conventional manufacturing practices.

In step 132, the timing and delivery characteristics, as these terms have been defined in the preceding discussion, for each injector are measured. Preferably, these characteristics are measured for at least two operating conditions: (1) a rated configuration being defined by high engine speed and high engine load or torque, and (2) a second, lower configuration being defined by a relatively lower engine speed and load. It should be understood that, in theory, measurements may be taken at an infinite number of operating conditions, limited practically only by memory and processing constraints. The start of injection characteristics of injector 22 is measured directly. That is, the time interval between the application of the fuel delivery command $S_{11}$ and the time when fuel injection begins is measured and recorded. The start of injection characteristic is defined by the sum of time intervals A and B, depicted in FIG. 3. The delivery or flow characteristics of injector 22 are measured as follows. The injector 22 is installed in a test bench which provides the fuel delivery command signal $S_{11}$ and supplies a test fluid. The resulting quantity of flow versus time is measured and recorded.

In step 134, each injector is categorized into one of a plurality of trim categories based on the measurements of the timing and delivery characteristics taken in step 132. Each trim category is defined by a preselected range of delivery and timing variations. Thus, in the preferred embodiment, each trim category is defined as a function of both delivery and timing variations from nominal. Associated with each trim category is an offset value for both timing and delivery calculations to be used later in the method to "trim" or tailor each injector. It should be appreciated that the resolution of the preselected range of timing and delivery variation values used to define the boundaries of the trim categories, and the corresponding offset values, have a predefined relationship, depending on the particular control structure and methodologies employed (e.g., a relatively large delivery variation may require a correspondingly large offset value).

In step 136, the trim category into which each injector has been categorized is recorded on the respective injector. This trim category designation may, for example, take the form of a four digit number stamped on injector 22. Further, a bar code, indicative of the trim category, may also placed on injector 22. It may be appreciated that these modes of recording the data are somewhat permanent in nature, however, other, more flexible forms of recording, for example, electrically-erasable programmable memory, which may be less permanent due to its capacity for being erased and changed, or a resistor having a selected resistance corresponding to data indicative of measured resultant characteristics, clearly fall within the scope of this invention.

At this point, each injector 22 has been fully assembled and characterized, and assigned a trim category indicative of the measured timing and delivery variation characteristics of that injector. The injector may now be shipped to a separate assembly operation to be assembled into an engine employing a plurality of such injectors, or, the injectors may be shipped to field service locations to replace worn or otherwise improperly operating units.

In step 138, the trim category from each injector is read therefrom by means 30 for communicating information to controlling means 92 and is inputted into control module 92, wherein the trim category or "trim" data signal is subsequently stored in memory means 96. It should be appreciated that the above-described steps eliminate the costly sorting and maintenance of matched pairs associated with prior art manufacturing approaches. Whatever path the characterized and recorded injector takes in the manufacturing/maintenance process, the signature information remains easily accessible via the stamped trim category and bar code. The method of the present invention may employ a bar code reader or scanner 114 to scan the bar code affixed to each injector 22, interpret the bar code to reconstruct the trim category, and transmit the reconstructed trim category via communications link 116 into control module 92. In the alternative to the above-described bar code and scanning sequence, the data indicative of the measured timing and delivery may be electronically encoded on a respective injector or apparatus, for example, via an encoded electronic chip or via selection of an appropriately valued resistor, the resistance being indicative of the data being encoded and then read (or sensed) by the electronic control module 92 via means 30, module 92 interpreting the read data or the sensed resistance value, respectively, to reconstruct the encoded data. This reading/sensing step may occur (i) following assembly of the injector into the fuel system or engine, or (ii) during initial startup of the fuel system or engine. It should be understood that the above-described resistor may be a resistor network. This methodology advantageously elminates the manual step of scanning the bar code.

The interface employed by control module 92 for the inputting of the "trim" categories designations may be of the type wherein the interface sequentially prompts means 30 for communicating information for the trim category of each injector number (i.e. control module 92 has been preprogrammed with the number of injectors employed in the particular configuration of fuel system 20). For example, an operator may, in response, scan the bar code of the particular injector that is to be assembled into that injector position.

The remaining steps of the present invention occur during the operation or control of the injectors 22. In step 140, a base fuel delivery signal $S_{11}$, based on input data signals $S_{1-8}$ and nominal timing and delivery characteristics for a MEIU injector is calculated for controlling each injector 22 according to any electronic fuel injection control strategy.

In step 142, for each injector 22, the base fuel delivery signal $S_{11}$ is adjusted based on respective timing and delivery offset values associated particularly with the trim category in which the subject injector 22 was categorized in step 134. It should be understood that although offset values are used in the preferred embodiment, more complex relationships and adjustment algorithms may be developed.

In step 144, each injector 22 is controlled in accordance with the respective adjusted fuel delivery signal so that the resulting timing and delivery characteristics of that controlled injector, when operated, approach nominal timing and delivery values, and which also converge with the timing and delivery characteristics of the other controlled injectors 22 in fuel system 20. It should be appreciated that fuel delivery signal $S_{11}$ is supplied to each injector 22 at a time, relative to engine crank shaft position, in accordance with a preprogrammed fuel injection control strategy. The timing adjustment refers to offset adjustments made to the time when $S_{11}$ is supplied to each injector so that the start of injection (SOI) occurs at the time desired by the fuel injection control strategy. Similarly, it should be appreciated that the delivery characteristic refers to the quantity of fuel injected for a calculated fuel delivery signal $S_{11}$ pulsewidth or duration. Therefore, particular injectors may require a longer or a shorter period of fuel injection to satisfy the nominal delivered quantity desired at the operating condition. As a result, fuel delivery signal $S_{11}$ may be elongated or foreshortened by control module 92 by using the trim category offset values so that delivery variations are reduced.

Figure 5:
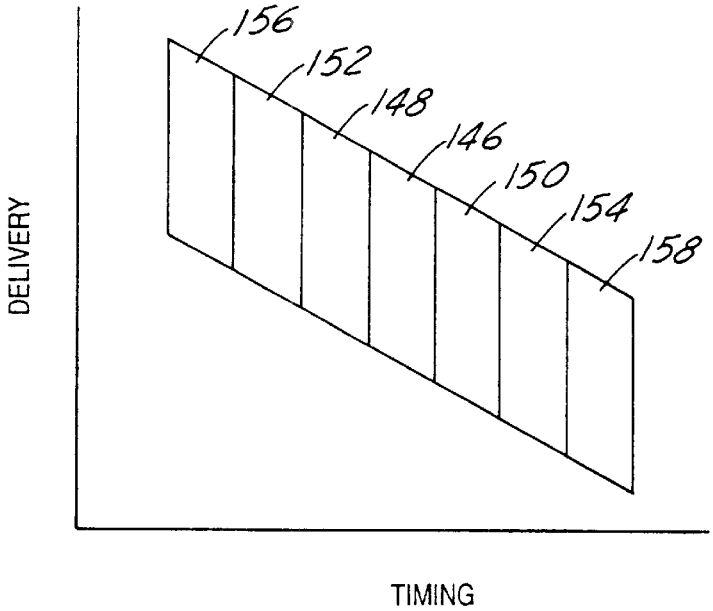
FIG. 5 is a category chart showing a plurality of trim categories as used in one embodiment of the present invention.
Figure 7:
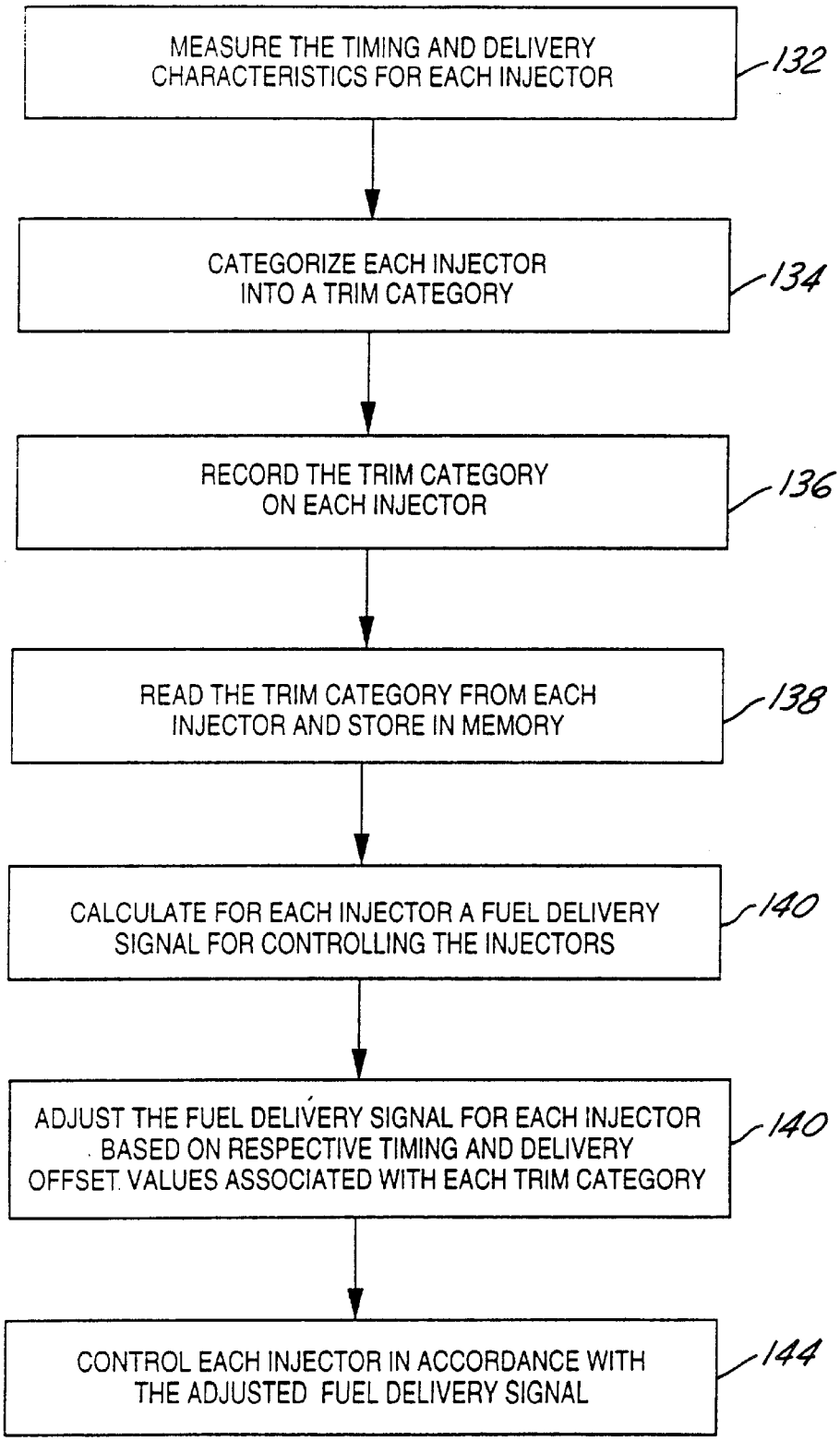
FIG. 7 is a flow chart depicting the steps of the method of the present invention for a mechanically-actuated electronically-controlled embodiment shown in FIGS. 1 and 2A.

Referring now to FIG. 5, a delivery versus timing trim category map is depicted, and shows in greater detail the categories into which an injector may be categorized in the preferred embodiment of the invention, as in step 134 of FIG. 7. For example, seven trim categories are available into which a MEUI injector may be categorized. The box indicated by reference numeral 146 is designated trim category "0", and represents nominal timing and delivery values. Boxes 148, 150, 152, 154, 156, and 158, respectively represent trim categories 1–6. Note that not all combinations of delivery and timing that are measured for a particular injector 22 have a corresponding trim category.

Figure 6:
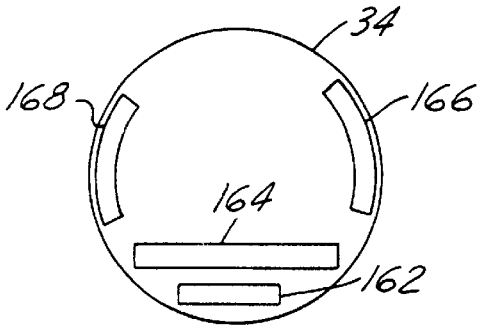
FIG. 6 is a diagrammatic view showing the face of an injector tappet of the injector of FIG. 2A, including a trim code for a trim category designation.

Referring now to FIG. 6, the face of injector tappet or follower 34 is shown which corresponds to and shows in greater detail the results of performing the step of recording the trim category on each injector (step 136 of FIG. 7). Box 162 may include a four digit trim code, box 164 may include a bar code readable by bar code scanner 114 and which is indicative of the trim category into which the subject injector 22 has been categorized, box 166 may include the injector serial number, and box 168 may include the injector part number. Other methods and manners of recording data indicative of the measured timing and delivery may be employed without departing from the spirit and scope of the present invention.

Figure 8:
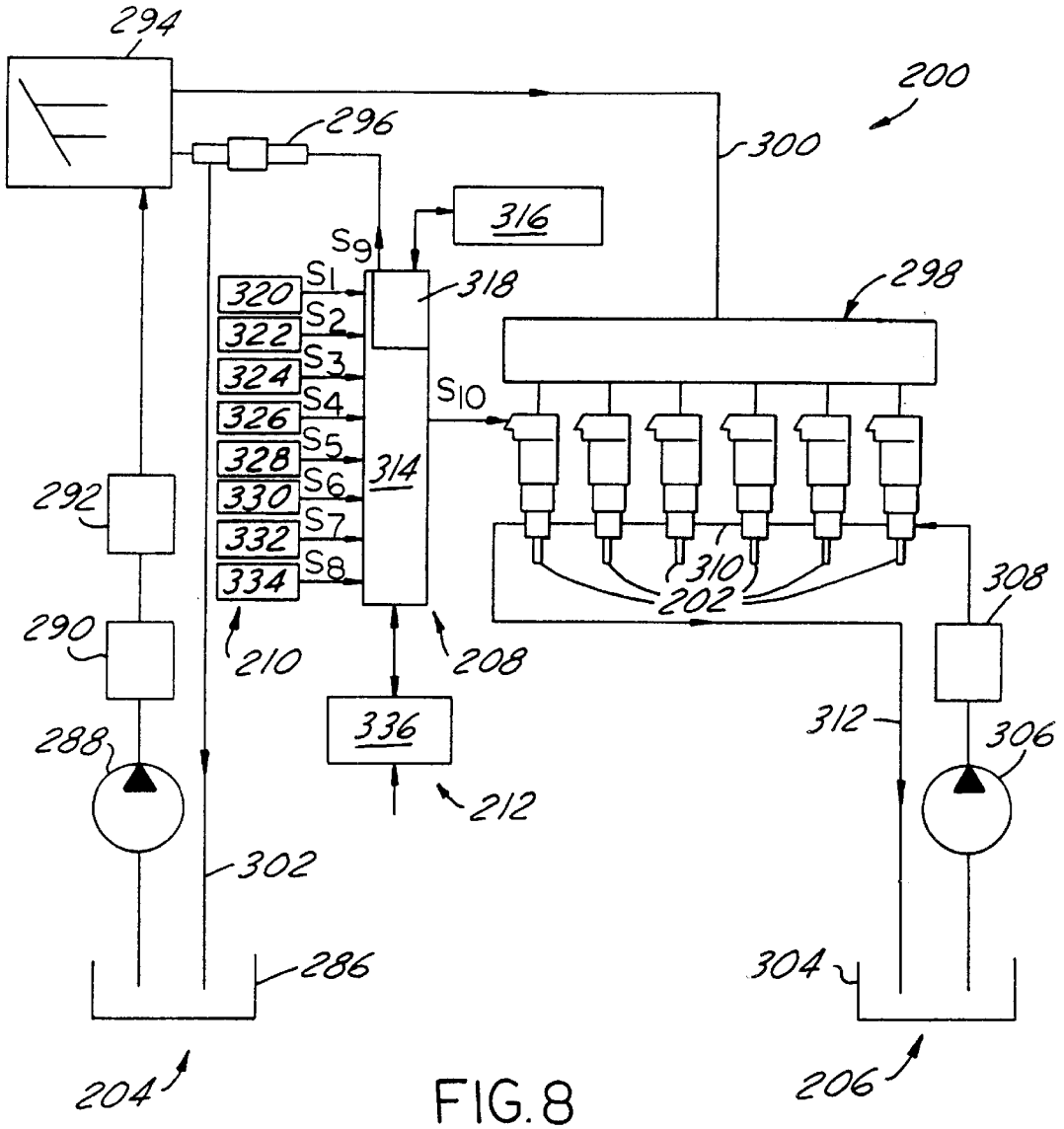
FIG. 8 is a combined block and diagrammatic view of a hydraulically-actuated electronically-controlled injector fuel system embodiment of the present invention.

A second embodiment of the present invention is directed toward a hydraulically-actuated electronically controlled fuel injector. As shown in FIG. 8, hydraulically-actuated electronically-controlled unit injector (HEUI) fuel system 200 includes at least one hydraulically-actuated electronically-controlled injector 202 for each combustion chamber cylinder of an engine (not illustrated), a means or circuit 204 for supplying hydraulically-actuating fluid to each injector 202, means or a circuit 206 for supplying fuel to each injector 202, and means or device 208 for electronically-controlling the fuel system 200. In the embodiment shown, the injectors 202 are preferably unit injectors. Alternatively, the nozzle and pumping mechanism of each injector 202 may not be unitized. Further, fuel system 200 includes sensor means 210 for detecting at least one, and preferably a plurality of, operating parameters and generating a respective plurality of operating parameter signals indicative of the parameters detected, and means or device 212 for communicating information or data to electronically controlling means 208.

Figure 9:
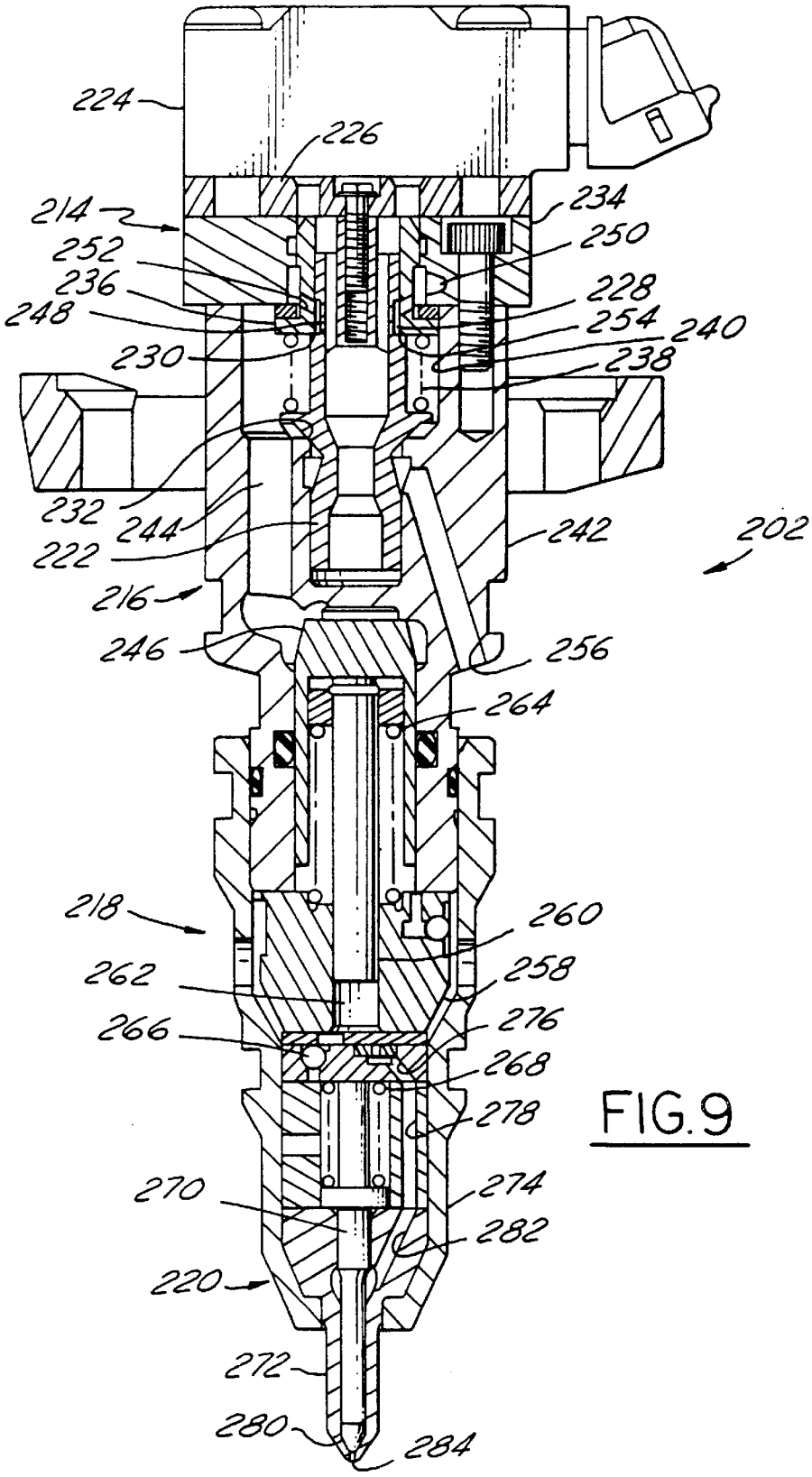
FIG. 9 is a diagrammatic, fragmentary, cross-sectional view showing the fuel injector of FIG. 8.

As shown in FIG. 9, each HEUI injector 202 includes an actuator and valve assembly 214, a body assembly 216, a barrel assembly 218, and a nozzle and tip assembly 220.

The actuator and valve assembly 214 is provided for selectively communicating relatively-high-pressure actuating fluid to each injector 202 in response to receiving fuel delivery signal $S_{10}$, as shown in FIG. 8. It should be appreciated that fuel delivery signal $S_{10}$ is functionally similar to fuel delivery $S_{10}$, as previously discussed in connection with a mechanically-actuated electronically-controlled fuel injector 22 (i.e., the signal $S_{10}$ is used to command the beginning and duration of fuel injection; however, due to mechanical differences between the MEUI and HEUI injectors, the relative response times, among other things, may be different). The actuator and valve assembly 214 preferably includes poppet valve 222, fixed stator 224, and movable armature 226 connected to the poppet valve 222. Popper valve 222 includes an upper annular peripheral groove 228, an annular upper seat 230, and an annular lower seat 232.

As shown in FIG. 9, the body assembly 216 includes a poppet adapter 234, a poppet sleeve 236, a poppet spring 238, a poppet spring cavity 240, a piston and valve body 242, an actuating fluid intermediate passage 244, and an intensifier piston 246. The poppet adapter 234 has a main bore formed therethrough, and a counter bore formed on the lower end portion of the main bore. An annular drain passage 248 is defined between poppet sleeve 236 and the counter bore of poppet adapter 234. The poppet adapter 234 also has a drain passage 250 defined therein. Preferably, the actuating fluid is chosen to be engine lubricating oil wherein drain passage 250 is adapted to communicate with an engine lubricating oil sump. Alternatively, the actuating fluid may be fuel wherein drain passage 250 is adapted to communicate with the fuel supply circuit 206.

As shown in FIG. 9, poppet sleeve 236 has at least one, and preferably two, laterally extending passages 252 formed therein. The poppet sleeve 236 has an annular shoulder formed on a lower end wherein an annular seat 254 is formed. The piston and valve body 242 has formed therein an actuating fluid inlet passage 256.

As shown in FIG. 9, the barrel assembly 218 includes barrel 258, plunger 260, plunger chamber 262, and plunger spring 264. The nozzle and tip assembly 220 includes an inlet flow check valve 266, a needle check spring 268, an axially movable needle check or valve 270, a needle check tip 272, a case 274, a first discharge passage 276, and a second discharge passage 278.

The needle check tip 272 includes an annular seat 280, a discharge passage 282, and at least one, but preferably a plurality of, fuel injection spray orifices 284. In the HEUI embodiment of FIG. 8, the means or device 204 for supplying hydraulic actuating fluid comprises an actuating fluid sump 286 such as an engine oil pan, an actuating fluid transfer pump 288, an actuating fluid cooler 290, an actuating fluid filter 292, a relatively-high-pressure actuating fluid pump 294, a pressure regulator 296, a high-pressure actuating fluid manifold 298, a manifold supply passage 300, and an actuating fluid return line 302.

As shown in FIG. 8, means or device 206 for supplying fuel to injectors 202 comprises a fuel tank 304, a fuel transfer and priming pump 306, a means or device 308 for conditioning fuel (filter, heater, etc.), a fuel manifold 310, and a return line 312.

The means or device 208 for electrically controlling the HEUI fuel system 200 preferably includes a programmable electronic control module 314, memory means 316 coupled with control module 314, and which may take the form of a non-volatile random access memory (NVRAM), and output means 318.

The memory means 316 is provided for storing trim data signals for each injector 202 for use by an electronic fuel injection control strategy implemented on control module 314. In addition, memory means 316 may further include a read-only memory (ROM) for storing a variety of predetermined operating data, as required by control module 314.

Control module 314 via output means 318 generates two output command signals. One output control signal, $S_9$ is the actuating fluid manifold pressure command signal. The pressure command signal $S_9$ is provided as an input to pressure regulator 296 to adjust the output pressure of high pressure pump 294. In order to accurately control the actuating fluid pressure, a sensor is provided for detecting the pressure of the hydraulically actuating fluid supplied to injectors 202 to generate a pressure indicative signal ($S_6$). Preferably the sensor detects the pressure of the actuating fluid in manifold 298. The control module 314 compares the actual actuating fluid pressure with the desired pressure and makes any necessary correction to control signal $S_9$. The control signal $S_9$ determines the pressure of the actuating fluid in manifold 298 and consequently determines the pressure of the fuel injected (i.e., rate) during each injection phase or cycle independent of engine speed and load. Significant to the HEUI embodiment of the present invention, is that delivery signal $S_{10}$ duration does not alone determine the quantity of fuel. Since the pressure or rate of injection can be controlled via adjustment of the actuating fluid pressure, a desired quantity of fuel may be injected via any one of a plurality of injection durations by varying the pressure. This aspect is different than for the MEUI embodiments where the duration, at a given operating condition, determines quantity, due to the fact that injection pressure is determined by mechanical actuation of plunger 46, which is dependent on the camshaft/rocker arm 32 assembly. The ability to control fuel quantity independent of duration and engine speed provides another degree of freedom for implementing the present invention to reduce or eliminate timing and delivery variations.

The other output control signal, $S_{10}$, is the fuel delivery command signal which is supplied to each injector 202. The fuel delivery command signal $S_{10}$ determines the time for starting fuel injection and quantity of such fuel injection during each injection phase or cycle independent of engine speed and load.

Sensor means 210 is provided in fuel system 200 for detecting various operating parameters and generating a respective parameter indicative signal $S_{1\text{-}8}$, hereinafter referred to as an input data signal, the data signal being indicative of the parameter detected. Signals $S_{1\text{-}8}$ are indicative of the same parameters as described in the MEUI embodiment. The sensor means 210 preferably includes one or more conventional sensors or transducers which periodically detect one or more parameters and generate corresponding data signals that are provided as inputs to electronic control module 314. Preferably, sensor means 210 includes engine speed sensor 320 adapted to detect engine speed and generate an engine speed signal $S_1$, an engine crank shaft position sensor 322 adapted to detect engine crank shaft position and generate an engine crank shaft position signal $S_2$, an engine coolant temperature sensor adapted to detect engine coolant temperature and generate an engine coolant temperature signal $S_3$, an engine exhaust back pressure sensor adapted to detect engine exhaust back pressure and generate an engine exhaust back pressure signal $S_4$, an air intake manifold pressure sensor adapted to detect air intake manifold pressure and generate an air intake manifold pressure signal $S_5$, an actuating fluid pressure sensor adapted to detect actuating fluid pressure and generate an actuating fluid pressure signal $S_6$, a throttle position setting sensor adapted to detect throttle position and generate a throttle position setting signal $S_7$, and a transmission gear setting sensor adapted to detect a gear setting and generate a gear setting signal $S_8$ (when so equipped).

Referring to FIG. 8, means or device 212 for communicating information or data to electronic control module 14 preferably includes a bar code reader/scanner 336. As described above in connection with the MEUI embodiment, the means 30 may take a plurality of forms.

INDUSTRIAL APPLICABILITY

Referring now to FIG. 9, the operation of injector 202 will now be described. High-pressure actuating fluid is supplied by high-pressure pump 294 to inlet passage 256 of body 242. When the actuator and valve assembly 214 of injector 202 is in a de-energized state, poppet valve 222 is in a first position wherein lower seat 232 abuts body 242, thus blocking the communication of the high-pressure actuating fluid to the poppet spring cavity 240 and intensifier piston 246. In the first position, since the fluid near the top of intensifier piston 246 is in communication with an actuating fluid sump by way of annular drain passage 248, laterally extending passages 252, and drain passage 250, the force exerted by plunger spring 264 displaces intensifier piston 246 to a first or upper position abutting body 242.

To begin injection, control module 314 applies a fuel delivery signal $S_{10}$ which places a selected injector 202 in an electrically energized state wherein armature 226 is magnetically drawn toward stator 224. Popper valve 222 moves with armature 226, and is thus also drawn towards stator 224. The poppet valve 222 moves upwardly along the longitudinal axis of injector 202 until annular upper seats 230 abuts annular seat 254 of poppet sleeve 236 to define a second position. In the second position, annular lower seat 232 no longer abuts a body 242, and high-pressure actuating fluid is admitted to the poppet spring cavity 240 and the passage 244 communicating with the intensifier piston 246. The passage 244 to intensifier piston 246 no longer communicates with actuating fluid sump 286 since annular upper seat 230 blocks communication with drain passage 248, and therefore the high-pressure actuating fluid supplied by manifold 298 hydraulically exerts a downward driving force on the top of intensifier piston 246. As piston 246 and plunger 260 move downward in response to the above-mentioned force, the pressure of the fuel in plunger chamber 262 below plunger 260 increases. The intensification of the fuel pressure to a desired level is achieved through the selected ratio of effective working areas between the intensifier piston 246 and plunger 260. This pressurized fuel flows through discharge passages 276, 278, and 282, wherein the pressurized fuel acts on needle check 270 to lift needle check 270 from annular seat 280 once a selected valve opening pressure is reached. The pressurized fuel is then discharged through fuel injection spray orifices 284.

To end injection, signal $S_{10}$ is discontinued by control module 314 to electrically de-energize injector 202. The absence of a magnetic force acting on armature 226 is effective to allow compressed poppet spring 238 to expand causing armature 226 and poppet valve 222 to move back to the first position. At the first position, high-pressuring actuating fluid is blocked from entering poppet spring cavity 240 and passage 244 to intensifier piston 246. Since the passage 244 to the intensifier piston 246 again communicates with actuating fluid sump 286, the fluid pressure therein decreased such that the force of the compressed plunger spring 264 overcomes the relatively smaller force applied by the actuating fluid to the top of intensifier piston 246, wherein compressed plunger spring 264 expands to return plunger 260 and intensifier piston 246 to the upper position against body 242. The pressure of the fuel and plunger chamber 262 below plunger 260 also decreases such that compressed needle check spring 268 moves needle check 270 downwardly against annular seat 280 of needle check tip 272 once a selected valve closing pressure is reached. The upwardly traveling plunger 260 allows inlet fuel to unseat flow check valve 266 to refill the plunger chamber 262.

Limitations in the manufacturing and assembly process may introduce variations from design specification, which may cause variations in the timing, quantity and pressure of fuel delivered to an engine combustion chamber. As discussed above, to some extent, these variations may be compensated for or by changing the pressure of the actuating fluid via control signal $S_9$.

Figure 10:
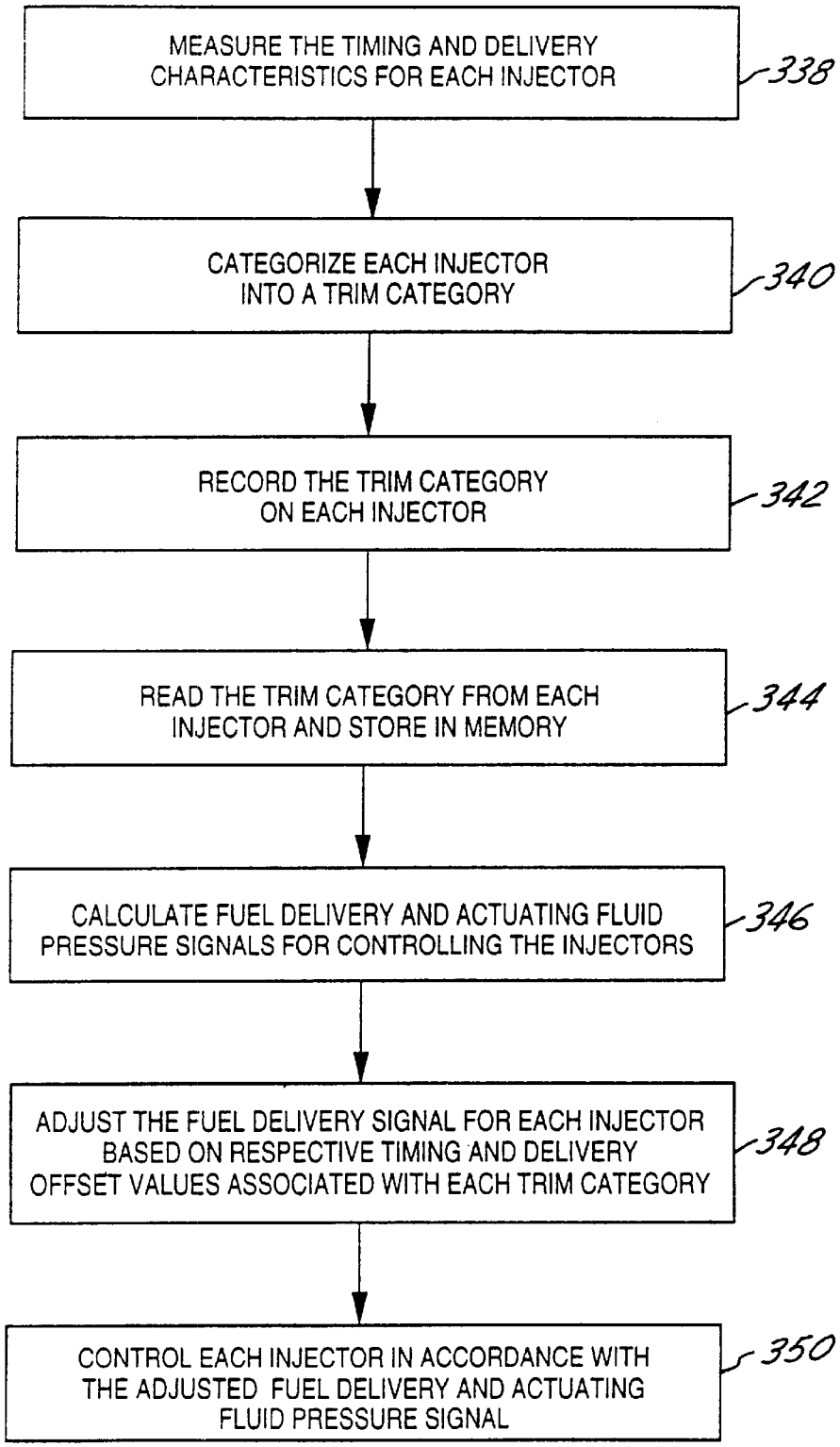
FIG. 10 is a flow chart depicting method steps of the present invention for a second embodiment shown in FIGS. 8–9.

Referring to FIG. 10, the method steps of the HEUI embodiment of the present invention are shown. In step 338, the timing and delivery characteristics of each injector are measured at a plurality operating conditions, in a fashion identical to that described in the mechanically-actuated electronically-controlled fuel injector embodiment except that, an actuating fluid pressure is set to a selected value. It should be appreciated that the injectors 202 installed in fuel system 200 are not necessarily measured as a group during the method steps of the present invention (nor are the injectors 22 in system 20). In fact, a key advantage of the present invention is that each categorized injector need not be identified with any particular fuel system or application.

In step 340, each injector is categorized into one of a plurality of trim categories, in a manner similar to that described in the MEUI embodiment.

In step 342, the trim category into which the subject injector 202 has been categorized is recorded permanently on the injector. The recording may take the form of a trim code stamped on each injector and/or affixing a bar code to the injector which is indicative of the selected trim category, in the same manner as described above (MEUI embodiment).

In step 344, the trim category is read from each injector and is inputted, which may be scanned in via bar code reader/scanner 336, to control module 314, in a manner identical to that described in the mechanically-actuated electronically-controlled injector embodiment.

The remaining steps of the present invention 346–350 occur during operation of fuel system 200. In step 346, control module 314 calculates, for each injector 202 in fuel system 200, a respective fuel delivery and actuating fluid pressure signals for controlling the injectors based on operating parameters including $S_{1\text{-}8}$ and nominal timing and delivery characteristic values for hydraulically-actuated electronically-controlled fuel injectors.

In step 348, a respective fuel delivery signal for each injector is adjusted based on respective timing and delivery offset values associated with a trim category into which the respective fuel injector has been categorized in step 340. Use of offset values is identical to that described above in connection with the mechanically-actuated electronically-controlled embodiment of the present invention.

In step 350, each injector is controlled in accordance with a respective adjusted fuel delivery signal and the actuating fluid pressure signal. Although current technology limits the practical extent to which changes in pressure may be made on an individual injector basis, it is expected that such technology will be available in the near future and thus such use of the pressure parameter clearly falls within the spirit and scope of this invention.

One of the many advantages of the present invention is the ability to eliminate the affects of variability introduced by the manufacturing and assembly process of an apparatus, such as a fuel injector or other fuel system component. This reduction or elimination of operating characteristic variability is obtained both simply, and inexpensively, and reduces to a large extent the end of the line rejection of assembled apparatus that would ordinarily not be of any value due to large variations in performance (i.e., would have to be scrapped).

Other aspects, objects, and advantages of this invention can be obtained from a study of the drawings, the disclosure and the appended claims.

We claim:

1. A method of operating an apparatus of the type having a nominal resultant characteristic at a plurality of operating conditions when controlled in accordance with a control signal, comprising the steps of:

measuring a resultant characteristic associated with the apparatus at a plurality of operating conditions;

adjusting the control signal as a function of the variation between the measured resultant characteristics and the nominal resultant characteristic and as a function of the operating condition of said apparatus; and controlling the apparatus in accordance with the adjusted signal such that the resultant characteristics of the apparatus when operated approach the nominal resultant characteristics.

2. The method of claim 1, further comprising the step of: associating the resultant characteristics measured in said measuring step with the apparatus.

3. The method of claim 2, wherein the control signal is generated by a control means having a memory means, and wherein said associating step includes the substep of storing data indicative of the measured resultant characteristics of the apparatus in the memory means.

4. The method of claim 2 wherein said associating step includes the substep of permanently recording data indicative of the measured resultant characteristics of the apparatus on said apparatus.

5. The method of claim 4, wherein the control signal is generated by a control means, and wherein said associating step includes the substeps of reading the data recorded on the apparatus and inputting the read data into the control means.

6. The method of claim 1 wherein said adjusting step includes the substeps of categorizing the apparatus, based on the measured resultant characteristics, into one of a plurality of trim categories wherein each category has an associated offset value, and modifying the controls signal as a function of the offset value.

7. The method of claim 6 wherein said modifying step is further performed as a function of an actual operating condition.

8. The method of claim 1 wherein said adjusting step includes the substeps of determining the relationship between the nominal resultant characteristics as a function of the control signal and the measured resultant characteristics of the apparatus as a function of the control signal, and modifying the control signal based upon the determined relationship.

9. The method of claim 8 wherein said modifying step is further performed as a function of an actual operating condition.

10. A method of operating a plurality of electronically-controlled fuel injectors of the type having a nominal start of injection characteristic wherein fuel injection is controlled by a fuel delivery signal, comprising the steps of:

measuring, for each injector, a respective start of injection characteristic;

associating, for each injector, the measured start of injection characteristic with the respective injector;

adjusting, for each injector, the fuel delivery signal as a function of the variation of the respectively associated measured start of injection characteristic from the nominal start of injection characteristic;

controlling each injector in accordance with the respective adjusted fuel delivery signal to reduce start of injection variation.

11. The method of claim 10, wherein the fuel delivery signal is generated by a control means having a memory means, and wherein said associating step includes the substep of storing data indicative of the measured start of injection characteristic of each injector in the memory means.

12. The method of claim 10, wherein said associating step includes the substep of permanently recording data indicative of the measured start of injection characteristic of each injector on a respective injector.

13. The method of claim 12, wherein said associating step includes the substep of categorizing each injector, based on a respective measured start of injection characteristic, into one of a plurality of trim categories wherein the permanently recorded data is a trim category designation.

14. The method of claim 12, wherein the fuel delivery signal is generated by a control means, and wherein said associating step includes the substeps of reading the data recorded on the injector and inputting the read data into the control means.

15. The method of claim 14, wherein said permanently recording data substep is performed by bar coding the respective data indicative of the measured start of injection on each injector to generate a respective bar code, and wherein said reading and inputting substeps are performed by scanning the bar codes recorded on the injectors, interpreting each bar code to reconstruct the data indicative of the measured start of injection characteristic, and transmitting the reconstructed data into the control means.

16. The method of claim 14 wherein said permanently recording data substep is performed by affixing, for each injector, a resistor having a resistance value indicative of the measured start of injection of the respective injector, and wherein said reading and inputting sub-steps are performed by sensing, for each injector, the resistance value of the respectively affixed resistor, and interpreting, for each injector, the sensed resistance value to reconstruct the data indicative of the measured start of injection characteristic.

17. The method of claim 13 wherein each category has an associated offset value, and wherein said adjusting step includes the substep of modifying the fuel delivery signal for each injector as a function of a respective offset value.

18. A method of operating a plurality of electronically-controlled fuel injectors wherein fuel injection is controlled by a fuel delivery signal, the injectors being of the type having a nominal delivery characteristic as a function of operating conditions, comprising the steps of:

measuring, for each injector, a respective delivery characteristic at a plurality of operating conditions;

associating, for each injector, the measured delivery characteristic with the respective injector;

adjusting for each injector, the fuel delivery signal as a function of the variation of the respectively associated measured delivery characteristic from the nominal delivery characteristic at each operating condition of the injector;

controlling each injector in accordance with the respective adjusted fuel delivery signal to minimize injector to injector delivery variation.

19. The method of claim 18, wherein said associating step includes the substep of permanently recording data indicative of the measured delivery characteristic of each injector on a respective injector.

20. The method of claim 19, wherein the fuel delivery signal is generated by a control means and wherein said associating step includes the substeps of reading the data recorded on the injector and inputting the read data into the control means.

21. The method of claim 20 wherein said permanently recording data substep is performed by bar coding the respective data indicative of the measured delivery on each injector to generate a respective bar code, and wherein said reading and inputting substeps are performed by scanning the bar codes recorded on the injectors, interpreting each bar code to reconstruct the data indicative of the measured delivery characteristic, and transmitting the reconstructed data into the control means.

22. The method of claim 20 wherein said permanently recording data substep is performed by affixing to each injector a resistor having a resistance value indicative of the measured delivery characteristic of the respective injector, and wherein said reading and inputting substeps are performed by sensing, for each injector, the resistance value of the respective affixed resistor and interpreting, for each injector, the sensed resistance value to reconstruct the data indicative of the measured delivery characteristic.

23. The method of claim 18, wherein the fuel delivery signal is generated by a control means having a memory means, and wherein said associating step includes the substep step of storing data indicative of the measured delivery characteristic of each injector in the memory means.

24. The method of claim 19 wherein said associating step includes the substep of categorizing each injector, based on a respective measured delivery characteristic, into one of a plurality of trim categories wherein the permanently recorded data is a trim category designation.

25. The method of claim 24 wherein each category has an associated offset value, and wherein said adjusting step includes the substep of modifying the fuel delivery signal for each injector as a function of a respective offset value.

26. A method of operating a plurality of electronically-controlled fuel injectors wherein fuel injection is controlled by a fuel delivery signal generated by a control means having a memory means, the injectors being of the type having a nominal start of injection characteristic and nominal delivery characteristic, comprising the steps of:

measuring, for each injector, a respective start of injection characteristic and delivery characteristic;

categorizing each injector into one of a plurality of trim categories as a function of the variation of the measured start of injection and delivery characteristics from the respective nominal start of injection and delivery characteristics, each trim category having an associated start of injection and delivery offset value;

recording the category into which each injector was categorized in said categorizing step on a respective injector;

storing the respective category recorded on each injector in the memory means;

calculating the fuel delivery signal as a function of actual operating conditions based on nominal start of injection and delivery characteristics;

adjusting the fuel delivery signal for each injector as a function of the respective start of injection and delivery offset values;

controlling each injector in accordance with the respective adjusted fuel delivery signal to reduce start of injection and delivery variation.

27. The method of claim 26 wherein the injectors are hydraulically-actuated injectors which are further controlled by an actuating fluid pressure command signal, the method further comprising the step of adjusting the actuating fluid pressure command signal for each injector as a function of the respective start of injection and delivery offset values.

28. The method of claim 26 wherein said measuring step is performed at a plurality of operating conditions, and wherein said adjusting step includes the substep of further adjusting the fuel delivery command signal as a function of an actual operating condition.

29. The method of claim 26 wherein said recording step includes the substep of affixing, for each injector, a respective bar code that is indicative of the category into which the respective injector was categorized.

30. The method of claim 26 wherein said recording step includes the substep of affixing, for each injector, a respective resistor having a resistance value that is indicative of the category into which the respective injector was categorized.

31. A system for controlling the delivery of fuel through a plurality of fuel injectors to an engine, each injector being of the type characterized by at least one observed performance parameter, comprising:

sensor means for detecting a plurality of operating parameters and generating a respective plurality of operating parameter signals indicative of the parameter detected;

control means responsive to said operating parameter signals for generating a base fuel delivery signal for each injector; each fuel injector being coupled with said control means to receive a respective base fuel delivery signal for controlled fuel delivery to the engine;

memory means coupled with said control means for storing trim signals for each injector, said trim signals being derived from observed performance parameter values taken at a plurality of operating conditions;

means for communicating said trim signals to said memory means;

said control means being responsive to said trim signals for trimming said base fuel delivery signal for each injector as a function of said trim signals and as a function of said operating parameter signals for reducing performance parameter variation.

*32. A method of preparing for shipment an apparatus of a type having measurable resultant characteristics at a plurality of operating conditions when controlled in accordance with a control signal, comprising the steps of:*

*measuring at least one resultant characteristic associated with the apparatus at a plurality of operating conditions;*

*determining a control signal adjustment as a function of a variation between the measured resultant characteristics and nominal resultant characteristics and as a function of an operating condition of the apparatus; and*

*recording data indicative of the control signal adjustment on the apparatus.*

*33. The method of claim 32 wherein the apparatus is a fuel injector; and*

*the plurality of operating conditions include different engine operating conditions.*

*34. The method of claim 33 wherein the control signal adjustment includes a fuel injection quantity adjustment that is a function of an operating condition of the fuel injector.*

*35. The method of claim 34 wherein said recording step includes a step of attaching a bar code to the fuel injector.*

*36. The method of claim 35 wherein the control signal adjustment includes a fuel injection timing adjustment.*

*37. The method of claim 36 wherein said attaching step includes a step of locating the bar code at a location that is readable after the fuel injector is installed in an engine.*

*38. A method of operating an apparatus of a type having measurable resultant characteristics at a plurality of operating conditions when controlled in accordance with a control signal, comprising the steps of:*

*reading data recorded on the apparatus that is indicative of a control signal adjustment;*

*inputting the control system adjustment data into an electronic control module;*

*establishing a control communication link between the apparatus and the electronic control module; and*

*controlling the apparatus in accordance with an adjusted control signal that is a function of a nominal control signal, an operating condition and the control signal adjustment data.*

*39. The method of claim 38 wherein the apparatus is a fuel injector; and the method includes a step of:*

*installing the fuel injector in an engine.*

*40. The method of claim 39 wherein said reading step includes a step of scanning a bar code attached to the fuel injector.*

*41. The method of claim 40 wherein the control signal adjustment data includes fuel injection quantity adjustment data that is a function of an operating condition of the fuel injector.*

*42. The method of claim 41 wherein the control signal adjustment data includes fuel injection timing adjustment data.*

*43. An actuatable mechanism that produces a measurable resultant characteristic in response to an electronic control signal, comprising:*

*a body;*

*an electrical actuator attached to said body;*

*a data recording attached to said body and including control signal adjustment data that is a function of a variation between measured resultant characteristics and nominal resultant characteristics and as a function of an operating condition of the mechanism.*

*44. The mechanism of claim 43 wherein the mechanism is a fuel injector.*

*45. The mechanism of claim 44 wherein said data recording includes a bar code.*

*46. The mechanism of claim 45 wherein the control signal adjustment data includes fuel injection quantity adjustment data that is a function of an operating condition of the fuel injector.*

*47. The method of claim 46 wherein the control signal adjustment data includes a fuel injection timing adjustment data.*

* * * * *

UNITED STATES PATENT AND TRADEMARK OFFICE

CERTIFICATE OF CORRECTION

PATENT NO. : RE 37,807 C1
APPLICATION NO. : 90/008757
DATED : November 24, 2009
INVENTOR(S) : Shinogle et al.

It is certified that error appears in the above-identified patent and that said Letters Patent is hereby corrected as shown below:

Title page should be deleted and replace with the attached title page.

On the title page, item (10) Number: should read -- US RE37,807 C1 --

Signed and Sealed this

Twenty-ninth Day of June, 2010

David J. Kappos

David J. Kappos
*Director of the United States Patent and Trademark Office*

(12) EX PARTE REEXAMINATION CERTIFICATE (7177th)

United States Patent

Shinogle et al.

(10) Number: US RE37,807 C1 --

(45) Certificate Issued: Nov. 24, 2009

(54) METHOD AND STRUCTURE FOR CONTROLLING AN APPARATUS, SUCH AS A FUEL INJECTOR, USING ELECTRONIC TRIMMING

(75) Inventors: Ronald D. Shinogle, Peoria, IL (US); Richard A. De Keyser, Edelstein, IL (US); Vernon R. Smith, Peoria, IL (US); Stephen F. Glassey, Gulnare, CO (US); Yasser A. Al Charif, Farmington, MI (US)

(73) Assignee: Caterpillar, Inc., Peoria, IL (US)

Reexamination Request:
No. 90/008,757, Jul. 18, 2007

Reexamination Certificate for:

| | |
|---|---|
| Patent No.: | **Re. 37,807** |
| Issued: | **Jul. 30, 2002** |
| Appl. No.: | **09/322,770** |
| Filed: | **May 28, 1999** |

Related U.S. Patent Documents

Reissue of:

| | |
|---|---|
| (64) Patent No.: | **5,634,448** |
| Issued: | **Jun. 3, 1997** |
| Appl. No.: | **08/251,549** |
| Filed: | **May 31, 1994** |

(51) Int. Cl.

| | |
|---|---|
| ***F02D 41/34*** | (2006.01) |
| ***F02D 41/40*** | (2006.01) |
| ***F02D 41/00*** | (2006.01) |
| ***F02D 41/24*** | (2006.01) |

(52) U.S. Cl. ..... 123/480; 123/478; 73/114.45

(58) Field of Classification Search ..... None
See application file for complete search history.

(56) References Cited

U.S. PATENT DOCUMENTS 4,509,123 A * 4/1985 Vereen ..... 700/130
4,790,277 A 12/1988 Schechter

FOREIGN PATENT DOCUMENTS

| | | |
|---|---|---|
| DE | 35 10 157 A1 | 9/1986 |
| JP | 61-215450 | 9/1986 |
| JP | 62-135840 | 8/1987 |
| JP | 62-197652 | 9/1987 |
| JP | 3-260483 | 11/1991 |
| JP | 4-334738 | 11/1992 |

OTHER PUBLICATIONS

Lauvin et al., "Electronically Controlled High Pressure Unit Injector System for Diesel Engines," SAE Technical Paper Series 911819, Sep. 1991.

(Continued)

*Primary Examiner*—Catherine S. Williams

(57) ABSTRACT

A structure and method for electronically minimizing or eliminating performance variation of an apparatus controllable by a control signal, such as an electronically-controlled fuel injector, is disclosed. The method includes the steps of measuring the resultant characteristics of the apparatus at a plurality of operating conditions, such as timing and delivery characteristics of the fuel injector, adjusting the control signal as a function of the measured resultant characteristics, such as by adjusting a base timing and duration or pulse width of a fuel delivery command signal for a fuel injector, and controlling the apparatus in accordance with the adjusted control signal to reduce performance variation. A structure is disclosed to compensate or trim for individual injector variation, includes an electronic control module having a memory for storing trim signals for each injector, the trim signals being derived from observed performance parameter values taken at a plurality of operating conditions, a plurality of sensors for detecting at least one, and preferably a plurality of operating parameters and generating a respective one, and preferably a plurality of, operating parameter signals, and a means for communicating the trim signals to the memory. The electronic control module adjusts a base fuel delivery signal for each injector as a function of the trim data signals for each injector.

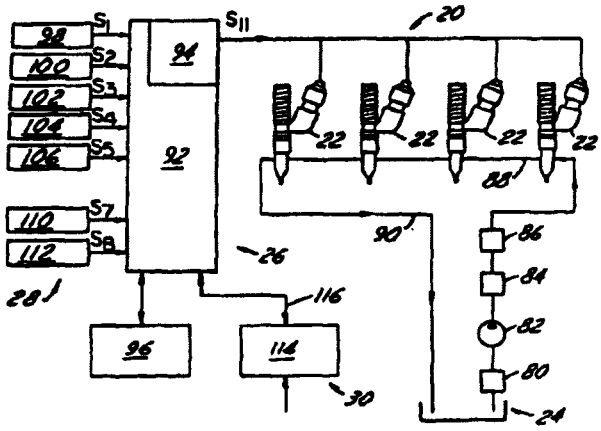

US00RE37807F1

(12) EX PARTE REEXAMINATION CERTIFICATE (7177th)

United States Patent
Shinogle et al.

(10) Number: US RE37,807 F1
(45) Certificate Issued: Nov. 24, 2009

(54) METHOD AND STRUCTURE FOR CONTROLLING AN APPARATUS, SUCH AS A FUEL INJECTOR, USING ELECTRONIC TRIMMING

(75) Inventors: Ronald D. Shinogle, Peoria, IL (US); Richard A. De Keyser, Edelstein, IL (US); Vernon R. Smith, Peoria, IL (US); Stephen F. Glassey, Gulnare, CO (US); Yasser A. Al Charif, Farmington, MI (US)

(73) Assignee: Caterpillar, Inc., Peoria, IL (US)

Reexamination Request:
No. 90/008,757, Jul. 18, 2007

Reexamination Certificate for:

| | |
|---|---|
| Patent No.: | **Re. 37,807** |
| Issued: | **Jul. 30, 2002** |
| Appl. No.: | **09/322,770** |
| Filed: | **May 28, 1999** |

Related U.S. Patent Documents

Reissue of:

| | |
|---|---|
| (64) Patent No.: | **5,634,448** |
| Issued: | **Jun. 3, 1997** |
| Appl. No.: | **08/251,549** |
| Filed: | **May 31, 1994** |

(51) Int. Cl.

| | |
|---|---|
| ***F02D 41/34*** | (2006.01) |
| ***F02D 41/40*** | (2006.01) |
| ***F02D 41/00*** | (2006.01) |
| ***F02D 41/24*** | (2006.01) |

(52) U.S. Cl. ..... 123/480; 123/478; 73/114.45

(58) Field of Classification Search ..... None
See application file for complete search history.

(56) References Cited

U.S. PATENT DOCUMENTS 4,509,123 A * 4/1985 Vereen ..... 700/130
4,790,277 A 12/1988 Schechter

FOREIGN PATENT DOCUMENTS

| | | |
|---|---|---|
| DE | 35 10 157 A1 | 9/1986 |
| JP | 61-215450 | 9/1986 |
| JP | 62-135840 | 8/1987 |
| JP | 62-197652 | 9/1987 |
| JP | 3-260483 | 11/1991 |
| JP | 4-334738 | 11/1992 |

OTHER PUBLICATIONS

Lauvin et al., "Electronically Controlled High Pressure Unit Injector System for Diesel Engines," SAE Technical Paper Series 911819, Sep. 1991.

(Continued)

*Primary Examiner*—Catherine S. Williams

(57) ABSTRACT

A structure and method for electronically minimizing or eliminating performance variation of an apparatus controllable by a control signal, such as an electronically-controlled fuel injector, is disclosed. The method includes the steps of measuring the resultant characteristics of the apparatus at a plurality of operating conditions, such as timing and delivery characteristics of the fuel injector, adjusting the control signal as a function of the measured resultant characteristics, such as by adjusting a base timing and duration or pulse width of a fuel delivery command signal for a fuel injector, and controlling the apparatus in accordance with the adjusted control signal to reduce performance variation. A structure is disclosed to compensate or trim for individual injector variation, includes an electronic control module having a memory for storing trim signals for each injector, the trim signals being derived from observed performance parameter values taken at a plurality of operating conditions, a plurality of sensors for detecting at least one, and preferably a plurality of operating parameters and generating a respective one, and preferably a plurality of, operating parameter signals, and a means for communicating the trim signals to the memory. The electronic control module adjusts a base fuel delivery signal for each injector as a function of the trim data signals for each injector.

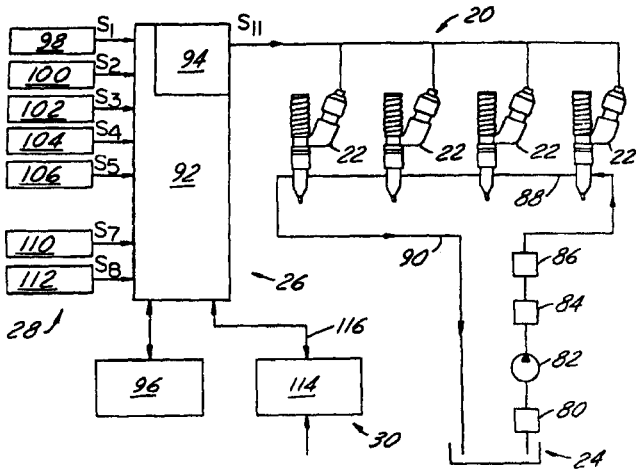

OTHER PUBLICATIONS

Tobolt, Exerpt from "Diesel Fundamentals, Service, Repair," pp. 97–101, 271–272, 297, The Goodheart–Wilcox Co. Inc., South Holland, IL.
Hames et al., "DDEC II—Advanced Electronic Diesel Control," SAE Technical Paper Series 861049, 1986.
Hames et al., "DDEC Detroit Diesel Electronic Control," SAE Technical Paper Series 850542, Feb. 1985.
Smith, "Have Screwdriver, Will Steal," Car and Driver, vol. 40, No. 1, Jul. 1994, pp. 157–167.
Chevrolet Camaro Brochure, Jul. 1993.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 10–17 and 26–30 is confirmed.

Claims 1–9, 18–25, 38–42, 44 and 46 are cancelled.

Claims 31–32, 43, 45 and 47 are determined to be patentable as amended.

Claims 33–37, dependent on an amended claim, are determined to be patentable.

New claims 48–72 are added and determined to be patentable.

31. A system for controlling the [[delivery]] start of injection of fuel through a plurality of fuel injectors to an engine, each injector being of the type characterized by at least one observed performance parameter, comprising:

sensor means for detecting a plurality of operating parameters and generating a respective plurality of operating parameter signals indicative of the parameter detected;

control means responsive to said operating parameter signals for generating a base fuel delivery signal for each injector; each fuel injector being coupled with said control means to receive a respective base fuel delivery signal for controlled fuel delivery to the engine;

memory means coupled with said control means for storing trim signals for each injector, said trim signals being derived from observed performance parameter values taken at a plurality of operating conditions;

means for communicating said trim signals to said memory means;

said control means being responsive to said trim signals for trimming said base fuel delivery signal for each injector as a function of said trim signals and as a function of said operating parameter signals for reducing [[performance parameter]] start of injection variation.

*32. A method of preparing for shipment* [[an]] a fluid delivery *apparatus of a type having measurable resultant characteristics at a plurality of operating conditions when controlled in accordance with a control signal, comprising the steps of:*

*measuring at least one resultant characteristic associated with the apparatus at a plurality of operating conditions;*

*determining a control signal adjustment as a function of a variation between the measured resultant characteristics and nominal resultant characteristics and as a function of an operating condition of the apparatus;* categorizing the apparatus into one of a plurality of trim categories based on the control signal addjustment; and

*recording data indicative of the control signal adjustment on the apparatus*, the data corresponding to the trim category of the apparatus.

*43.* [[An actuatable mechanism]] A fuel injector that produces a measurable resultant characteristic in response to an electronic control signal, comprising:

*a body;*

*an electrical actuator attached to said body* and configured to control timing of fluid injection from the body;

*a data recording attached to said body and including control signal adjustment data that is a function of a variation between measured resultant characterisitics and nominal resultant characteristics and* [[as]] is a function of an operating condition of the [[mechanism]] fuel injector, the control signal adjustment data including a start of injection adjustment to reduce start of injection variation.

*45. The mechanism of claim* [[44]] 43 wherein said data recording includes a bar code.

*47. The* [[method]] mechanism of claim [[46]] 45 wherein the control signal adjustment data includes [[a fuel injection timing adjustment data]] the timing of fluid delivery adjustment.

48. The mechanism of claim 43 wherein the control signal adjustment data includes a total fluid output from the body adjustment.

49. A method of preparing for shipment a fuel injector of a type having measurable resultant characteristics at a plurality of operating conditions when controlled in accordance with a control signal, comprising the steps of:

measuring at least one resultant characteristic associated with the fuel injector at a plurality of operating conditions;

determining a control signal adjustment as a function of a variation between the measured resultant characteristics and nominal resultant characteristics and as a function of an operating condition of the fuel injector, the control signal adjustment including a start of injection adjustment to reduce start of injection variation; and recording data indicative of the control signal adjustment on the fuel injector.

50. The method of claim 49 wherein the plurality of operating conditions include different engine operating conditions.

51. The method of claim 50 wherein the start of injection adjustment is a function of an operating conditon of the fuel injector.

52. The method of claim 51 wherein said recording step includes a step of applying a bar code to the fuel injector.

53. The method of claim 52 wherein said applying step includes a step of locating the bar code at a location that is readable after the fuel injector is installed in an engine.

54. A method of preparing for shipment a fuel injector of a type having measurable resultant characteristics at a plurality of operating conditions when controlled in accordance with a control signal, comprising the steps of:

measuring at least one resultant characteristic associated with the fuel injector at a plurality of operating conditions;

determining a control signal adjustment as a function of a variation between the measured resultant characteristics and nominal resultant characteristics and as a function of an operating condition of the fuel injector;

categorizing the fuel injector into one of a plurality of trim categories based on the control signal adjustment; and recording data indicative of the control signal adjustment on the fuel injector, the data corresponding to the trim category of the fuel injector.

55. The method of claim 54 wherein the plurality of operating conditions include different engine operating conditions.

56. The method of claim 55 wherein the control signal duration adjustment is a function of an operating condition of the fuel injector.

57. The method of claim 56 wherein said recording step includes a step of applying a bar code to the fuel injector.

58. The method of claim 57 wherein said applying step includes a step of locating the bar code at a location that is readable after the fuel injector is installed in an engine.

59. A method of preparing for shipment a fluid delivery apparatus of a type having measurable resultant characteristics at a plurality of operating conditions when controlled in accordance with a control signal, comprising the steps of:

measuring at least one resultant characteristic associated with the fluid delivery apparatus at a plurality of operating conditions;

determining a control signal adjustment as a function of a variation between the measured resultant characteristics and nominal resultant characteristics and as a function of an operating condition of the fluid delivery apparatus, the control signal adjustment including a start of delivery from the fluid delivery apparatus adjustment to reduce start of delivery variation; and recording data indicative of the control signal adjustment on the fluid delivery apparatus.

60. The method of claim 59 wherein the plurality of operating conditions include different engine operating conditions.

61. The method of claim 60 wherein the start of delivery from the fluid delivery apparatus adjustment is a function of an operating condition of the fluid delivery apparatus.

62. The method of claim 61 wherein said recording step includes a step of applying a bar code to the fluid delivery apparatus.

63. The method of claim 62 wherein the control signal adjustment includes a total delivery through the fluid delivery apparatus adjustment.

64. The method of claim 63 wherein said applying step includes a step of locating the bar code at a location that is readable after the fluid delivery apparatus is installed in an engine.

65. A fuel injector that produces a measurable resultant characteristic in response to an electronic control signal, comprising:

a body;

an electrical actuator attached to said body; and a data recording applied to said body and including control signal adjustment data that is a function of a variation between measured resultant characteristics and nominal resultant characteristics and is a function of an operating condition of the fuel injector, the data recording including a bar code.

66. The fuel injector of claim 65 wherein the control signal adjustment data includes the timing of fluid delivery adjustment.

67. The fuel injector of claim 65 wherein the control signal adjustment data includes the total fluid output from the body adjustment.

68. A fuel injector that produces a measurable resultant characteristic in response to an electronic control signal, comprising:

a body;

an electrical actuator attached to said body;

a data recording attached to said body and including control signal adjustment data that is a function of a variation between measured resultant characteristics and nominal resultant characteristics and as a function of an operating conditon of the fuel injector, the control signal adjustment data including one of a plurality of trim categories based on the variation.

69. The mechanism of claim 68, wherein said data recording includes a bar code.

70. The mechanism of claim 69, wherein the trim category is associated with fuel injection quantity adjustment data that is a function of an operating condition of the fuel injector.

71. The mechanism of claim 69, wherein the trim category is associated with timing of fluid delivery adjustment data.

72. The mechanism of claim 69, wherein the trim category is associated with both total fluid output from the body adjustment data and timing of fluid delivery from the body adjustment data.

* * * * *